(12) United States Patent
Cordatos et al.

(10) Patent No.: US 8,741,029 B2
(45) Date of Patent: Jun. 3, 2014

(54) FUEL DEOXYGENATION USING SURFACE-MODIFIED POROUS MEMBRANES

(75) Inventors: Haralambos Cordatos, Colchester, CT (US); Louis J. Spadaccini, Manchester, CT (US); Thomas G. Tillman, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 319 days.

(21) Appl. No.: 13/173,864

(22) Filed: Jun. 30, 2011

(65) Prior Publication Data

US 2013/0000180 A1    Jan. 3, 2013

(51) Int. Cl.
*B01D 53/22* (2006.01)
*B01D 19/00* (2006.01)
*B05D 5/00* (2006.01)

(52) U.S. Cl.
USPC ............. 95/46; 95/54; 96/6; 96/11; 96/12; 427/245

(58) Field of Classification Search
USPC ......... 95/45, 46, 54; 96/4, 6, 11, 12; 210/640, 210/180; 44/300; 427/245
See application file for complete search history.

(56) References Cited

U.S. PATENT DOCUMENTS

| | | | |
|---|---|---|---|
| 4,554,076 A * | 11/1985 | Speaker ..................... | 210/639 |
| 4,923,679 A * | 5/1990 | Fukasawa et al. ............. | 95/54 |
| 5,123,937 A * | 6/1992 | Shibata et al. ................. | 95/46 |
| 6,315,815 B1 | 11/2001 | Spadaccini et al. | |
| 6,582,113 B2 | 6/2003 | Rogers | |
| 6,939,392 B2 * | 9/2005 | Huang et al. ................. | 95/46 |
| 2005/0184006 A1 * | 8/2005 | Ma et al. ....................... | 95/54 |
| 2005/0211096 A1 * | 9/2005 | Burlatsky et al. ............. | 96/6 |
| 2011/0020192 A1 * | 1/2011 | Baumann et al. ............. | 96/11 |

FOREIGN PATENT DOCUMENTS

| | | |
|---|---|---|
| EP | 1568403 A1 | 8/2005 |
| EP | 1579902 A1 | 9/2005 |
| GB | 2462176 A | 2/2010 |
| GB | 2462178 A | 2/2010 |
| WO | WO91/01791 A1 | 2/1991 |
| WO | WO2005/025718 A1 | 3/2005 |

OTHER PUBLICATIONS

The partial European Search Report in counterpart European Application No. 12174443.7 filed Jun. 29, 2012.

* cited by examiner

*Primary Examiner* — Jason M Greene
(74) *Attorney, Agent, or Firm* — Kinney & Lange, P.A.

(57) ABSTRACT

A fuel deoxygenation system includes an oxygen permeable membrane having a porous membrane and an oleophobic layer. The porous membrane has pores that create a passage extending from a first side to an opposite second side of the porous membrane. The pores have an average pore diameter less than or equal to about 0.06 microns. The oleophobic layer and the porous membrane allow oxygen to cross the oxygen permeable membrane but substantially prevent fuel from crossing the oxygen permeable membrane. A method for removing dissolved oxygen from a fuel includes delivering fuel to an oxygen permeable membrane and removing oxygen from the fuel using the oxygen permeable membrane. A method for modifying a surface of a porous membrane includes depositing an oleophobic treatment agent on the porous membrane, removing solvent and heating the porous membrane to form an oleophobic layer on the porous membrane.

20 Claims, 2 Drawing Sheets

FUEL DEOXYGENATION USING SURFACE-MODIFIED POROUS MEMBRANES

BACKGROUND

Because of its relative abundance in the air of the atmosphere, relatively large quantities of oxygen, as well as nitrogen and other gases, readily dissolve into various liquid media. The presence of dissolved oxygen, in particular, in some liquids, such as hydrocarbon fuels, may be objectionable because it supports oxidation reactions that yield undesirable by-products.

For instance, jet fuel in aircraft may be used as a coolant for various systems in the aircraft. When air-saturated fuel is heated to temperatures above about 120° C. (250° F.) to 150° C. (300° F.), the dissolved oxygen reacts to form free radical species (coke precursors) which initiate and propagate other autoxidation reactions leading to the formation of objectionable deposits, called "coke" or "coking". As fuel temperature increases beyond about 150° C. (300° F.), the process of autoxidation consumes oxygen and forms carbonaceous deposits. The temperature at which autoxidation begins differs for different fuels. These autoxidation reactions may also occur in jet fuel as it is heated immediately prior to injection for combustion, such that deposits may occur in the injectors. In any event, the formation of such deposits impairs the normal functioning of a fuel delivery system, either with respect to an intended heat exchange function or the efficient injection of fuel.

A fuel stabilization unit reduces the amount of oxygen dissolved within a fuel. Reducing the amount of oxygen in a fuel increases the maximum allowable temperature of the fuel, thereby increasing its heat sink capacity when used for cooling components onboard the aircraft. One method of removing dissolved oxygen from fuels is by using a semi-permeable membrane deoxygenator. In a membrane deoxygenator, fuel is pumped over an oxygen permeable membrane. As the fuel passes over the membrane, a partial oxygen pressure differential across the membrane promotes the transport of oxygen out of the fuel through the membrane. Exemplary deoxygenators remove oxygen to a level at least below that at which significant coking would otherwise occur. As used herein, "significant coking" is the minimum amount of coking which, if it occurred in the interval between normal intended maintenance events for such portions of the fuel system, would be viewed as objectionable. Such coking occurs most readily in the portions of the fuel system having high temperatures and/or constricted flow paths.

SUMMARY

A fuel deoxygenation system includes an oxygen permeable membrane having a porous membrane and an oleophobic layer. The porous membrane has pores extending from a first side of the porous membrane to an opposite second side of the porous membrane. The pores of the porous membrane have an average pore diameter less than or equal to about 0.06 microns. The oleophobic layer is located on the first side of the porous membrane. The oleophobic layer and the porous membrane allow oxygen to cross the oxygen permeable membrane but substantially prevent fuel from crossing the oxygen permeable membrane.

A method for removing dissolved oxygen from a fuel includes delivering fuel to an oxygen permeable membrane and removing oxygen from the fuel using the oxygen permeable membrane. The oxygen permeable membrane includes a porous membrane and an oleophobic layer. The porous membrane has pores extending from a first side of the porous membrane to an opposite second side of the porous membrane. The pores of the porous membrane have an average pore diameter less than or equal to about 0.06 microns. The oleophobic layer is located on the first side of the porous membrane. The oleophobic layer and the porous membrane allow oxygen to cross the oxygen permeable membrane but substantially prevent fuel from crossing the oxygen permeable membrane.

A method for modifying a surface of a porous membrane used to deoxygenate fuel includes depositing an oleophobic treatment agent on a first side of the porous membrane, removing solvent used during deposition of the oleophobic treatment agent and heating the porous membrane to form an oleophobic layer on the first side of the porous membrane. The porous membrane has pores extending from the first side of the porous membrane to an opposite second side of the porous membrane. The pores of the porous membrane have an average pore diameter less than or equal to about 0.06 microns.

DETAILED DESCRIPTION

The present invention provides a fuel deoxygenation system in which a surface-modified porous membrane serves as the oxygen permeable membrane for removing dissolved oxygen from a fuel. The oleophobicity of the porous membrane is increased to prevent fuel from crossing the oxygen permeable membrane along with the oxygen. For porous membranes with large average pore sizes, additional modifications to the porous membrane are made. The present invention also provides a method for removing dissolved oxygen from a fuel and a method for modifying a surface of a porous membrane used to deoxygenate fuel.

Figure 1:
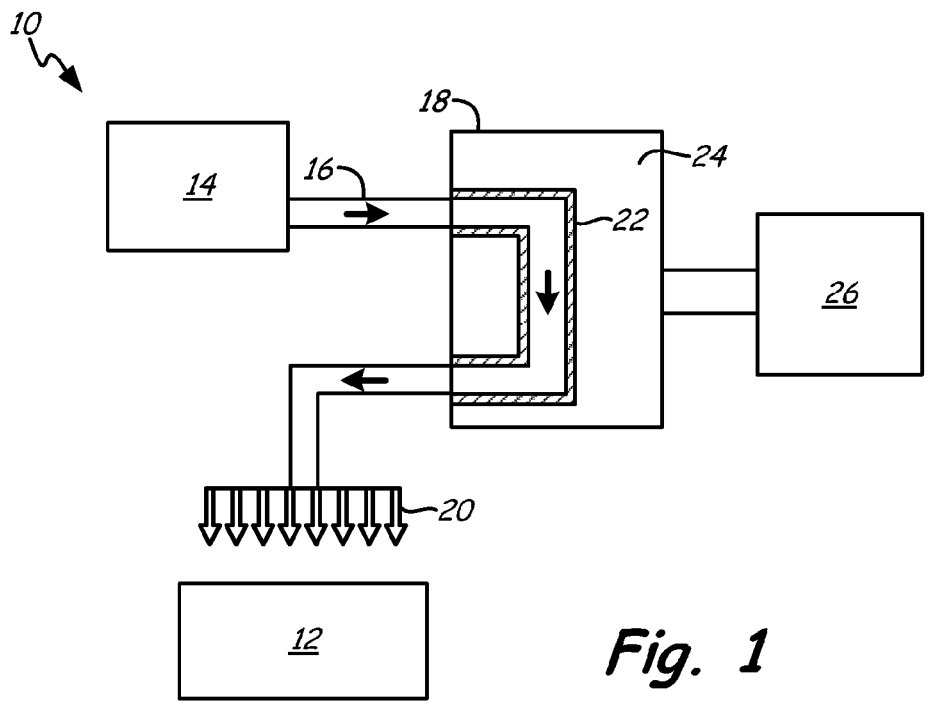
FIG. 1 is a simplified schematic of a fuel delivery system.

FIG. 1 illustrates a simplified schematic of one embodiment of a fuel delivery system. Fuel delivery system 10 delivers fuel to gas turbine engine 12. Fuel from fuel supply 14 flows through fuel flow path 16 to fuel stabilization unit (FSU) 18 where the fuel is deoxygenated. The fuel continues to flow through fuel path 16, exiting FSU 18, and is discharged from fuel nozzles 20 into engine 12.

FSU 18 removes oxygen and other constituents (such as nitrogen and light hydrocarbons) from the fuel flowing through FSU 18. Within FSU 18, fuel flow path 16 is bounded by oxygen permeable membrane 22 and passes through vacuum chamber 24. Vacuum chamber 24 communicates with vacuum source 26. Vacuum source 26 is used to create a vacuum in vacuum chamber 24, reducing the partial pressure of oxygen on the vacuum side of oxygen permeable membrane 22.

Oxygen permeable membrane 22 separates oxygen from the fuel flowing through fuel flow path 16 in FSU 18. Oxygen and other small molecules can cross oxygen permeable membrane 22, while the main fuel components cannot. Oxygen transmits across oxygen permeable membrane 22 depending on the oxygen partial pressures on the fuel side (within fuel flow path 16) and the vacuum side (inside vacuum chamber 24) of the membrane. For example, when the partial pressure of oxygen is lower in vacuum chamber 24 than the partial pressure of oxygen in fuel flow path 16, oxygen from the fuel flowing in fuel flow path 16 crosses oxygen permeable membrane 22 to enter vacuum chamber 24. Thus, reducing the partial pressure of oxygen on the vacuum side of oxygen permeable membrane 22 so that it is lower than the partial pressure of oxygen on the fuel side of the membrane enables deoxygenation of fuel.

Figures 2A, 2B, 3:
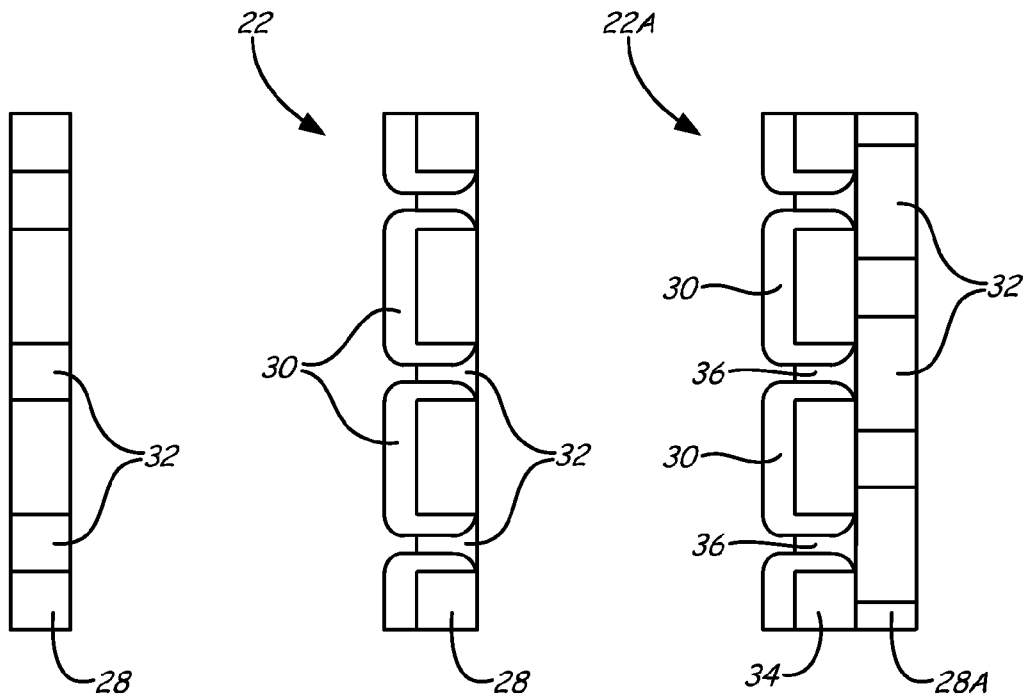
FIG. 2A is a simplified depiction of an unmodified porous membrane.
FIG. 2B is a simplified depiction of a surface-modified porous membrane having an average pore size diameter of less than 0.06 microns.
FIG. 3 is a simplified depiction of a surface modified porous membrane having an average pore size diameter of greater than 0.06 microns.

According to the present invention, oxygen permeable membrane 22 is a surface-modified porous membrane. FIG. 2A illustrates an unmodified porous membrane. Porous membrane 28 includes pores 32. FIG. 2B illustrates one embodiment of a surface-modified porous membrane having an average pore size diameter of less than 0.06 microns. Oxygen permeable membrane 22 includes porous membrane 28 and oleophobic layer 30. Porous membrane 28 includes pores 32. Pores 32 are located throughout porous membrane 28 and each pore 32 extends essentially through the entire thickness of porous membrane 28 either as a single channel or via communication with adjacent pores or pores emanating from the opposite side of porous membrane 28. Thus, each pore 32 extends or interconnects with other pores to form a passage from one side of porous membrane 28 to the opposite side of porous membrane 28. The orientation and geometry of pores 32 can vary (e.g., straight, angled, etc.), but a substantial number of pores 32 in porous membrane 28 are continuous throughout the entirety of porous membrane 28 (i.e. a majority of pores 32 do not "dead end" before reaching the opposite side of porous membrane 28). Porous membrane 28 can be a porous polymer material, a porous ceramic material, a porous metal or any combination thereof. In exemplary embodiments, porous membrane 28 has a thickness between about 50 nanometers and about 4 microns. Porous membrane 28 can be supported by a macroporous layer such as a non-woven sheet or similar structure for enhanced dimensional stability.

Oleophobic layer 30 is a layer deposited on one side of porous membrane 28. Oleophobic layer 30 increases the oleophobicity of one side of oxygen permeable membrane 22 (the side that comes into contact with the fuel). By increasing the oleophobicity of oxygen permeable membrane 22, oxygen permeable membrane 22 deters fuel from interacting with and crossing oxygen permeable membrane 22. At elevated temperatures and pressures, significant amounts of fuel may cross untreated porous membrane 28, but adding oleophobic layer 30 to porous membrane 28 considerably reduces the amount of fuel that is able to cross oxygen permeable membrane 22. Oleophobic layer 30 does not substantially affect permeation of oxygen across oxygen permeable membrane 22.

In one embodiment, oleophobic layer 30 is produced using a silicone-based compound. Silicone-based compounds include fluorosilicones such as fluoroalkyl silanes. One exemplary fluoroalkyl silane is tridecafluorooctyl triethoxysilane. In another embodiment, oleophobic layer 30 is produced using a perfluorinated amphiphilic compound. Amphiphilic compounds possess both hydrophilic and oleophilic (lipophilic) properties. Perfluorinated amphiphilic compounds include perfluorinated carboxylic acids. One exemplary perfluorinated amphiphilic compound is perfluorododecanoic acid, $(CF_3)(CF_2)_{10}COOH$.

Oleophobic layer 30 can be applied to porous membrane 28 in various ways. In one embodiment, an oleophobic solution is deposited on porous membrane 28, followed by drying and curing to produce oleophobic layer 30. In another embodiment, oleophobic layer 30 is a stretched film and is applied to porous membrane 28 as a film. In yet another embodiment, oleophobic layer 30 is applied to porous membrane as a track-etched membrane. In exemplary embodiments, oleophobic layer 30 has a thickness between a single monolayer and about 1 micron.

Formation of oleophobic layer 30 can generally be accomplished by simple deposition of the amphiphilic compound (for example, solution casting and subsequent drying of the solvent) or by chemically reacting the hydrophilic end of the amphiphilic compound with appropriate functional groups on the surface of porous membrane 28, thus creating a permanent bond between the oleophobic agent and the membrane surface. While simple deposition is adequate for single-use items and other applications where long-term durability is not a concern, a more permanent bond between porous membrane 28 and oleophobic layer 30 is useful for FSU applications. Regarding the selection of a method for chemically bonding oleophobic layer 30 onto the surface of porous membrane 28, two examples are provided: one example for an inorganic porous membrane 28 and one example for an organic (polymer-based) porous membrane 28.

Inorganic materials, particularly metal oxides, typically contain surface hydroxyl (OH) groups, which can be reacted with the carboxylic acid of an amphiphilic molecule possessing an oleophobic end, such as perfluorododecanoic acid. The reaction between surface OH groups and the carboxylic acid (COOH) group of the perfluorododecanoic acid is an esterification reaction, typically carried out at elevated temperature in the presence of sulfuric acid as a catalyst. The concentration of the OH groups at the surface varies substantially among different materials. Those materials exhibiting the highest concentrations, such as alumino-silicates, are particularly suitable as they will yield the highest concentration of grafted esters of perfluorododecanoic acid, which in turn will result in increased oleophobicity.

Regarding polymeric porous membranes, one approach to bonding oleophobic layer 30 to porous membrane 28 is to apply techniques developed for chemical surface modification of textile fibers to render them oleophobic, as described for example in U.S. Pat. No. 5,350,795. Another approach is to utilize atmospheric plasma treatments such as Enercon's Plasma3™ (http://www.enerconind.com/treating/products/wide-web/plasma3.aspx) or Dow Corning's Plasma Solutions (http://www.dowcorning.com/content/webabstract/ABS_26-1313-01.asp). In this technique, the polymer surface of porous membrane 28 is first activated with ionized gas and subsequently grafted with an oleophobic treatment agent to form oleophobic layer 30. The oleophobic treatment agent can be in gaseous or liquid form, depending on the technology developed by the plasma treatment manufacturer.

Merely applying oleophobic layer 30 to porous membrane 28 does not ensure that significant amounts of fuel will not cross oxygen permeable membrane 22. Fuel is typically delivered to FSU 18 at pressures ranging from 345 kPa (50 psi) to 1.4 MPa (200 psi). At these pressure conditions, some amount of fuel will cross oxygen permeable membrane 22 unless the average pore size of pores 32 in porous membrane 28 are kept below a threshold level. In exemplary embodiments the average pore diameter of pores 32 is between about 0.002 microns and about 0.06 microns. Where the average pore diameter of pores 32 is about 0.06 microns or smaller, oxygen permeable membrane 22 (porous membrane 28 with oleophobic treatment layer 30) is suitable for deoxygenating fuel delivered to oxygen permeable membrane 22 at pressures up to about 1380 kPa (200 psi) without allowing a substantial amount of fuel to cross oxygen permeable membrane 22. FIG. 2B illustrates oxygen permeable membrane 22 in which pores 32 of porous membrane 28 have an average pore diameter between about 0.002 microns and about 0.06 microns.

Where the average pore diameter of pores 32 in porous membrane 28 is greater than 0.06 microns, additional modifications to porous membrane 28 can be made prior to application of oleophobic layer 30. In one embodiment, the average pore diameter of pores 32 in porous membrane 28 is reduced by combining porous membrane 28 with a second porous membrane to reduce the average pore diameter.

FIG. 3 illustrates one embodiment of a surface-modified porous membrane having an average pore size diameter greater than 0.06 microns. Oxygen permeable membrane 22A includes porous membrane 28A, second porous membrane 34 and oleophobic layer 30. Porous membrane 28A contains pores 32 having an average pore diameter greater than 0.06 microns. Second porous membrane 34 contains pores 36 having an average pore diameter less than or equal to 0.06 microns. In exemplary embodiments the average pore diameter of pores 36 is between about 0.005 microns and about 0.06 microns. Second porous membrane 34 bridges pores 32 of porous membrane 28A, reducing the average pore size of the combined membrane. In order for second porous membrane 34 to effectively bridge pores 32 of porous membrane 28A, the average pore diameter of pores 32 of porous membrane 28A must generally be between about 0.07 microns and about 0.2 microns. Porous membranes having average pore diameters greater than about 0.2 microns cannot be effectively bridged. In such cases, second porous membrane 34 would fill in pores 32 rather than layer across the surface of porous membrane 28A. Once second porous membrane 34 has been applied to porous membrane 28A, oleophobic layer 30 can be applied to second porous membrane 34 as described above with respect to porous membrane 28.

Figure 4:
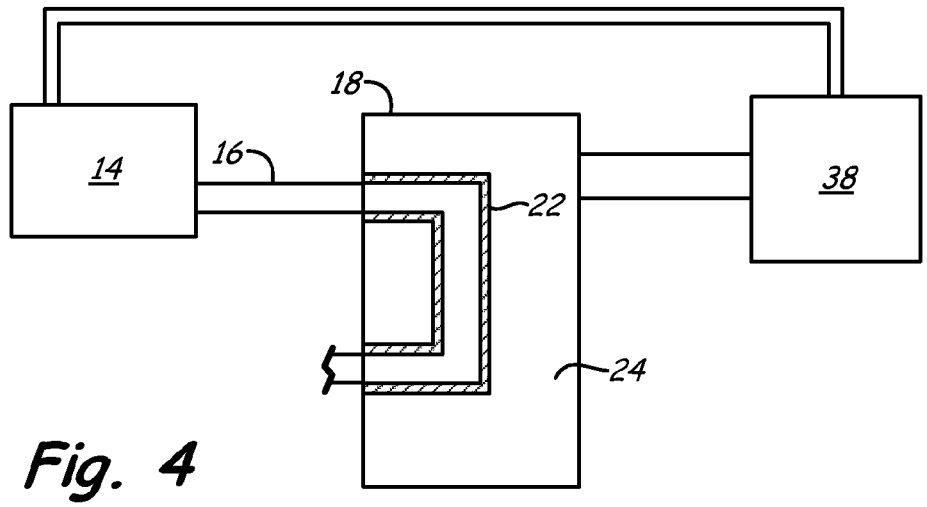
FIG. 4 is a simplified schematic of a fuel stabilization unit with a condenser.

Even with oleophobic layer 30, small amounts of fuel vapor may still permeate oxygen permeable membrane 22. A condenser is used to condense any fuel vapor that crosses oxygen permeable membrane 22. FIG. 4 illustrates a fuel stabilization unit with a condenser. FSU 18 includes condenser 38. Condenser 38 communicates with the oxygen receiving side of FSU 18 (vacuum chamber 24). Fuel vapor that crosses oxygen permeable membrane 22 is condensed by condenser 38. The condensed fuel is then delivered back to fuel supply 14. In one embodiment, condenser 38 is operated based on vapor-compression refrigeration. Alternatively, condenser 38 is a thermoelectric device.

Figure 5:
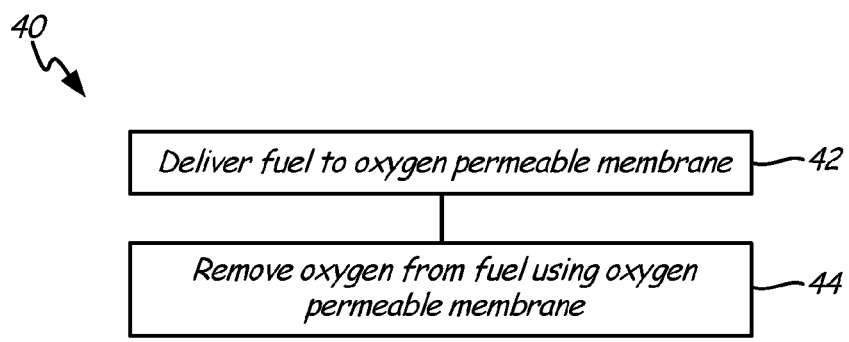
FIG. 5 is a simplified flow diagram of a method for removing dissolved oxygen from a fuel using a surface-modified porous membrane.

The present invention can be used to remove dissolved oxygen from a fuel. FIG. 5 illustrates a flow diagram of a method for removing dissolved oxygen from a fuel using a surface-modified porous membrane. According to method 40, dissolved oxygen is removed from a fuel. Method 40 includes delivering fuel to an oxygen permeable membrane in step 42. In exemplary embodiments fuel is delivered to oxygen permeable membrane 22 at a pressure between about 345 kPa (50 psi) to 1.4 MPa (200 psi). Oxygen permeable membrane 22 includes porous membrane 28 and oleophobic layer 30. Porous membrane 28 has pores 32 extending from a first side of porous membrane 28 to a second opposite side of porous membrane 28. Pores 32 have an average pore diameter less than or equal to about 0.06 microns. Oleophobic layer 30 is located on the first side of porous membrane 28. Together oleophobic layer 30 and porous membrane 28 allow oxygen to cross oxygen permeable membrane 22 but substantially prevent fuel from crossing oxygen permeable membrane 22. In step 44, oxygen is removed from the fuel using oxygen permeable membrane 22.

Figure 6:
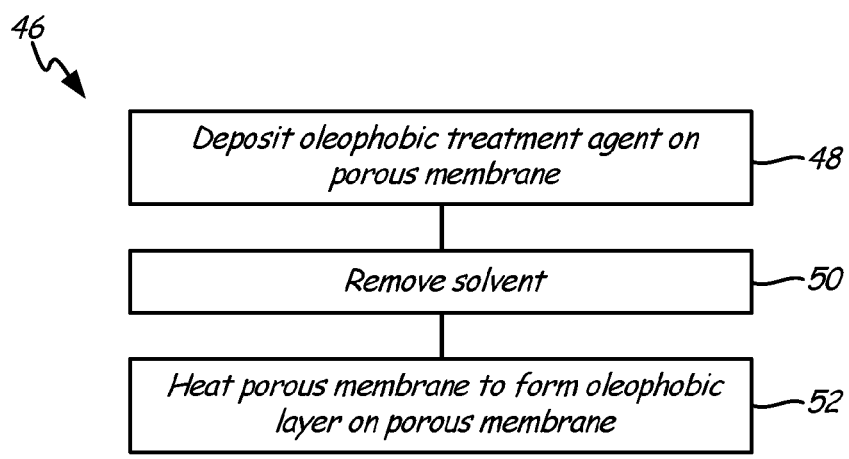
FIG. 6 is a simplified flow diagram of a method for modifying a surface of a porous membrane used to deoxygenate fuel.

The present invention can also be used to modify a surface of a porous membrane used for deoxygenating fuel. FIG. 6 illustrates a flow diagram of a method for modifying a surface of a porous membrane used to deoxygenate fuel. Method 46 includes depositing an oleophobic treatment agent on a first side of a porous membrane in step 48. Porous membrane 28 has pores 32 extending from the first side of porous membrane to an opposite second side of porous membrane 28. Pores 32 have an average pore diameter less than or equal to about 0.06 microns. The oleophobic treatment agent includes fluorosilicones and perfluorinated amphiphilic compounds. In one exemplary embodiment, the oleophobic treatment agent is perfluorododecanoic acid. In an alternate embodiment, the oleophobic treatment agent is tridecafluorooctyl triethoxysilane. In step 50, solvent used during oleophobic treatment agent deposition step 48 is removed. Any solvent is removed using heat, vacuum or their combination. In step 52, the treated porous membrane is heated to form oleophobic layer 30 on the first side of porous membrane 28.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel deoxygenation system comprising:
    an oxygen permeable membrane comprising:
        a porous membrane having pores that create a passage extending from a first side of the porous membrane to an opposite second side of the porous membrane, wherein the pores of the porous membrane have an average pore diameter less than or equal to 0.06 microns; and
        an oleophobic layer located on the first side of the porous membrane, wherein the oleophobic layer and the porous membrane allow oxygen to cross the oxygen permeable membrane but substantially prevent fuel from crossing the oxygen permeable membrane.

2. The fuel deoxygenation system of claim 1, wherein the oleophobic layer is produced using a fluorosilicone.

3. The fuel deoxygenation system of claim 1, wherein the oleophobic layer is produced using a perfluorinated amphiphilic compound.

4. The fuel deoxygenation system of claim 3, wherein the oleophobic layer is produced using a perfluorinated carboxylic acid.

5. The fuel deoxygenation system of claim 1, wherein the oleophobic layer is a stretched film.

6. The fuel deoxygenation system of claim 1, wherein the oleophobic layer is a track-etched membrane.

7. The fuel deoxygenation system of claim 1, further comprising:

a second porous membrane having pores that create a passage extending from a first side of the second porous membrane to an opposite second side of the second porous membrane, wherein the pores of the second porous membrane have an average pore diameter greater than 0.06 microns, and wherein the porous membrane having an average pore diameter less than or equal to 0.06 microns is formed on the first side of the second porous membrane.

8. The fuel deoxygenation system of claim 5, wherein the pores of the second porous membrane have an average pore diameter between 0.07 microns and about 0.2microns.

9. The fuel deoxygenation system of claim 1, further comprising:
a condenser for liquefying fuel vapor that crosses the oxygen permeable membrane.

10. A method for removing dissolved oxygen from a fuel, the method comprising:
delivering fuel to an oxygen permeable membrane comprising:
a porous membrane having pores that create a passage extending from a first side of the porous membrane to an opposite second side of the porous membrane, wherein the pores of the porous membrane have an average pore diameter less than or equal to 0.06 microns; and
an oleophobic layer located on the first side of the porous membrane, wherein the oleophobic layer and the porous membrane allow oxygen to cross the oxygen permeable membrane but substantially prevent fuel from crossing the oxygen permeable membrane; and
removing oxygen from the fuel using the oxygen permeable membrane.

11. The method of claim 10, wherein fuel is delivered to the oxygen permeable membrane at pressure between about 345 kPa (50 psi) and about 1.4 MPa (200 psi).

12. The method of claim 11, wherein the oleophobic layer is produced using a perfluorinated carboxylic acid.

13. The method of claim 10, wherein the oleophobic layer is a stretched film.

14. The method of claim 10, wherein the oleophobic layer is a track-etched membrane.

15. The method of claim 10, wherein the oxygen permeable membrane further comprises a second porous membrane located on the second side of the porous membrane, wherein the second porous membrane has pores that create a passage extending from a first side of the second porous membrane to an opposite second side of the second porous membrane, wherein the pores of the second porous membrane have an average pore diameter greater than 0.06 microns.

16. The method of claim 10, wherein the pores of the second porous membrane have an average pore diameter between 0.07 microns and about 0.2 microns.

17. The method of claim 10, further comprising:
condensing fuel vapor that crosses the oxygen permeable membrane.

18. A method for modifying a surface of a porous membrane used to deoxygenate fuel, the method comprising:
depositing an oleophobic treatment agent on a first side of the porous membrane, wherein the porous membrane comprises pores that create a passage extending from the first side of the porous membrane to an opposite second side of the porous membrane, and wherein the pores of the porous membrane have an average pore diameter less than or equal to 0.06 microns,
removing solvent used during deposition of the oleophobic treatment agent; and
heating the porous membrane to form an oleophobic layer on the first side of the porous membrane.

19. The method of claim 18, the porous membrane is deposited on a first side of a second porous membrane having pores that create a passage extending from the first side of the second porous membrane to an opposite second side of the second porous membrane, wherein the pores of the second porous membrane have an average pore diameter greater than 0.06 microns.

20. The method of claim 18, wherein the oleophobic treatment agent is perfluorododecanoic acid.

* * * * *